United States Patent Office 3,564,412

Patented Feb. 16, 1971

3,564,412

DERIVED CLOCK FROM CARRIER ENVELOPE

Sang Y. Whang, Miami, Paul E. Payne, Fort Lauderdale, and Robert G. Ragsdale, Hollywood, Fla., assignors to Milgo Electronic Corporation, Miami, Fla.

Filed Mar. 1, 1968, Ser. No. 709,609

Int. Cl. H04l 27/18, 7/08

U.S. Cl. 325—30 12 Claims

ABSTRACT OF THE DISCLOSURE

Digital data transmission at very high bit rates through randomly selected ordinary voice-grade telephone lines by the use of a transmitter which includes digital differential modulation and a receiver which includes a digital differential angle demodulation, together with a derived clock circuit at the receiver, is disclosed. The communication link includes bandpass filters which block sideband frequencies located at $1/T$ from the centerpoint, $f_0$, of the filter; wherein T is the modulation period, and $f_0$ is the carrier frequency. For random data patterns, the envelope at the receiver, due to band-limiting, is peaked at the middle of a center modulation period and drops sufficiently toward zero amplitude between modulation periods so as to contain strong $1/T$ harmonics which provide for clock derivation by slaving a local oscillator with a $1/T$ output signal. For some non-varying data patterns, the envelope does not include sufficient ripple for clock derivation. Amplitude modulation of the digital angle modulation signal at a predetermined frequency is provided at the transmitter so as to produce a signal having $1/2T$ sidebands which are passed by the filter and thus are available at the receiver for clock derivation.

CROSS REFERENCE TO RELATED APPLICATIONS

This application is an improvement to the system and clock recovery circuitry of a related application entitled "Band Limited Telephone Line Data Communication System," Ser. No. 565,214 filed July 14, 1966 and assigned to the same assignee as the present application.

In addition, this application, although not limted thereto, is particularly applicable to the system disclosed and claimed in another related application entitled "Digital Angle Modem" having Ser. No. 709,761, filed on even date herewith by the inventors Robert G. Ragsdale and Paul E. Payne and assigned to the same assignee as is the present application.

BACKGROUND OF THE INVENTION

(1) Field of the invention

The field of this invention includes communication systems employing present-day commercial, military, telephone networks and similar carrier transmitting facilities.

(2) Description of the prior art

Clock recovery for high data transmission rates presents a complex problem when the receiver and transmitter are remotely located and are interconnected through networks of varying amplitude and delay characteristics. It has been common practice to encode, prior to the data to be transmitted, a unique group of clock-indicating signals which are utilized at the receiver to synchronize the output rate of a local oscillator clock. Such a technique presents several drawbacks in that it requires additional encoding equipment at the transmitter and at the receiver. Furthermore, in the case of digital systems, these unique clock-indicating signals must be eliminated entirely from the various possible combinations of random information-representing data because a random group of such data signals might be interpreted as the unique clock control signal thus moving the receiver clock completely out of synchronism with the incoming data. Such a prior art approach is also limited in its application to systems which exhibit widely variable amplitude and delay characteristics in that in some instances the unique signals for controlling the local oscillator at the receiver may be shifted by distortion to such an extent that the local oscillator is set at clock positions which do not correspond to the information-representing portions of the received data. Further, the local clock must be continually updated by time-spaced groups of unique clock signals thus increasing the complexity of the encoding and decoding equipment and, at the same time, wasting valuable data transmitting time.

SUMMARY OF THE INVENTION

A transmitter output in the form of a modulated signal representative of varying multibit groups of digital data which are used to modulate a carrier frequency of $f_0$, is applied to a communication link exhibiting a linear phase over a passband width defined by $1/T$ Hz. where T is the modulation period, Hz. is cycles per second and the center frequency of the link is at $f_0$. The communication link exhibits the above mentioned characteristics in that it includes a composite of filters which may be at either the transmitter or the receiver; and the link may further include some form of fixed and/or variable equalizer to properly condition the amplitude and delay characteristics of the link. Such filters have a passband width which includes the sideband frequency components which are equal to the $1/T$ repetition rate, and thus a clock reference frequency may not be available in the envelope at the receiver. A signal component at the $1/T$ rate is obtained by additionally amplitude-modulating at the transmitter, the angle modulated signal at a frequency selected to present sideband frequency components which lie in the passband width for the filter. Another feature includes an angle offset for the amplitude modulation signal with respect to the modulation periods for the angle modulated signal. This other feature provides increased reliability for any and all data patterns.

In addition, certain angle-modulated data patterns resemble the amplitude-modulated carrier; and thus may, by chance, cancel out the $1/2T$ sideband components so as to render the derived clock circuit ineffective. Accordingly, another feature of this invention provides for the phase of the amplitude modulation to be periodically reversed, so as to assure clock recovery in the presence of all data patterns.

BRIEF DESCRIPTION OF THE DRAWINGS

The foregoing principles and features of this invention may more fully be appreciated by reference to the accompanying drawings wherein.

DESCRIPTION OF THE PREFERRED EMBODIMENT

Figure 1:
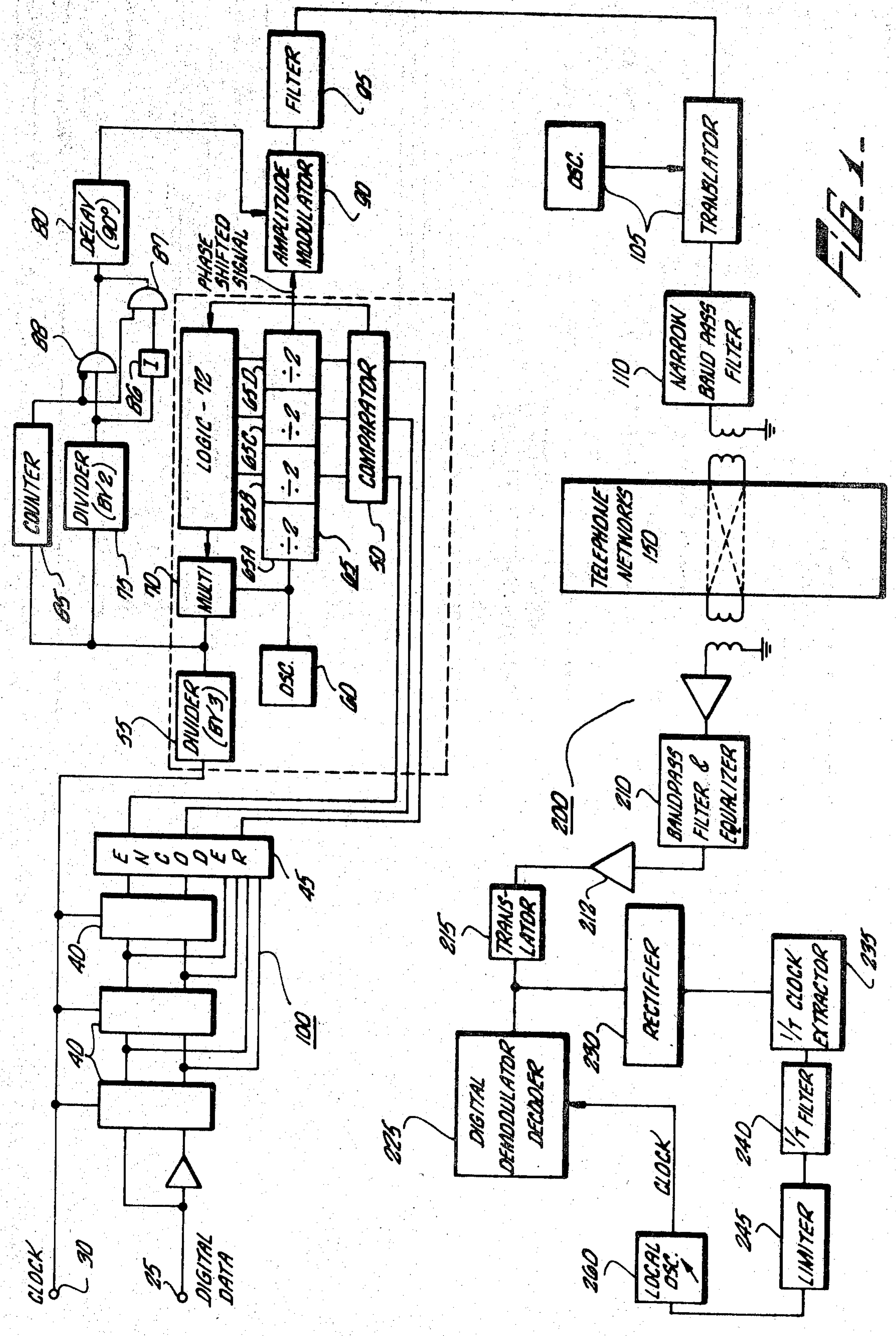
FIG. 1 represents a block diagram of a digital data communication system incorporating the principles of this invention.

Turning now to the drawing of FIG. 1, a transmitter 100 is depicted which includes a terminal 25 for receiving series digital data from a computer or other system, together with a terminal 30 for receiving a clock train of pulses having a repetition rate equal to the incoming digital data rate. The operation of the shift register with stages 40, the encoder 45, the comparator 50 and the associated means for generating a phase-shifted signal is fully described in the foregoing referenced patent application entitled "Digital Angle Modem," and need not be repeated here.

Reference may be made to such application if a detailed understanding of the system operation is required. Briefly, however, random information-representing data in series form is stored in multibit groups with one bit each in each stage 40. The multibit data patterns are encoded and represented as phase levels to comparator 50. The incoming clock rate at terminal 30 is divided by a number equal to the number of bits in a given multibit group by a divider circuit 55. A high frequency oscillator 60, which has an output rate many times higher than the incoming data rate, is applied to a plurality of tandem connected stages in a divider circuit 65, which stages 65A through 65D may advantageously be circuits capable of dividing by two. A multivibrator 70 in synchronism with the high frequency output from oscillator 60 is triggered by the clock divider circuit 55 so as to control logic gates 72 which alter the output phase of the various tandem connected divider stages in accordance with the phase angle called for by the output of encoder circuit 45. A high frequency phase-shifted signal having phases indicative of the multibit data groups is emitted from the last stage of the divider circuit 65.

In the foregoing described operation the clock divider circuit 55 determines the $1/T$ modulation rate. The output signal from divider 55 is again divided by two in another divider circuit 75 which has an output signal of $1/2T$. This $1/2T$ rate signal is shifted in phase a predetermined amount by delay circuit 80. The phase-shifted $1/2T$ output signal from delay 80 is applied as an amplitude modulating signal to an amplitude modulator 90 which receives, in addition to the $1/2T$ output signal, the phase-shifted information-representing signal from divider circuit 65. A counting circuit 85 monitors the output signals from circuit 55 and for a given number of such outputs shifts the phase of the amplitude modulating signal by 180° to guard against losing a derived clock signal in certain instances to be described in more detail hereinafter.

The amplitude modulated signal from modulator 90, which includes the information-representing phase shifts, is filtered by filter 95 and is translated to a low frequency signal by oscillator-translator 105 for application to a narrow bandpass filter 110. Filter 110 has a passband width defined by $1/T$ Hz., with a center frequency $f_0$ which is the carrier frequency of the transmitter 100. The narrow bandpass filter 110 and a similar matched filter 210 located at the receiver location 200 form a composite linear phase filter. These filters 110, 210 and a fixed and/or variable equalizer tend to compensate for the inherently unmatched delay and amplitude characteristics of fortuitously selected voice-grade telephone lines by making all of the normally unconditioned telephone lines and associated switching networks 150 appear matched over the passband width of $1/T$ Hz.

Figure 2:
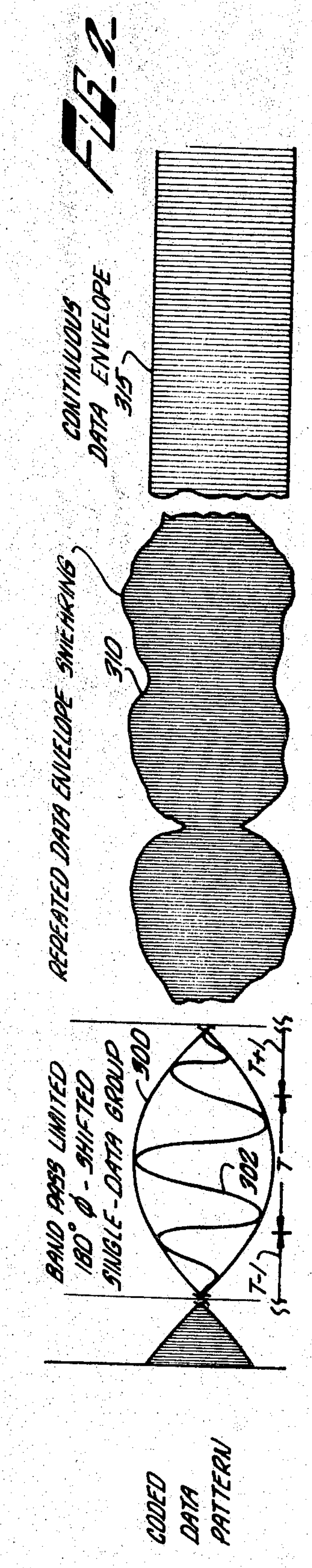
FIG. 2 is an envelope chart useful in promoting a clear understanding of the system in FIG. 1.

Full details of one equalizing technique for the unconditioned voice-grade telephone lines of networks 150 is fully described in the foregoing mentioned patent applications and need not be repeated here. Suffice it to say that filters 110, 210 and an equalizer at receiver location 200 will, for an idealized single modulation period with a 180° phase-shift, produce an envelope 300, FIG. 2. Envelope 300 is in the form of a peaked amplitude wave at the center of its assigned modulation period T, and drops toward substantially zero amplitude at the midpoint of adjacent modulation periods $T-1$ and $T+1$. Shown with the envelope 300, FIG. 2, is a low frequency signal 302 which is a modulated carrier signal passed by the frequency limits of the narrow bandpass filters 110 and 210. A high frequency translator 215 at receiver 200 receives the phase-shifted envelope 300, FIG. 2, after it has been amplified by amplifier 212 and translates it to a higher frequency signal. Translation to a higher frequency does not change the phase or amplitude relationships. However, there are a significantly higher number of carrier cycles within each modulation period after translation and, thus, this technique yields a greater number of phase-shifted cycles which are available for comparison purposes in a digital demodulator and decoder 225 described in detail in the earlier referenced patent applications.

At receiver 200, a demodulating operation in circuit 225 may require a clock signal which, in accordance with the receiver portion of this invention, is derived from the data envelope itself. The carrier envelope at the output of the translator 215 may trace many different forms depending upon the data which it contains. For example, envelope 310 of FIG. 2 shows a randomly-variable data pattern which is typical of the envelope formed by one group of several data patterns being repeated numerous times. Such repetition introduces additional frequency components which tend to frequency smear the envelope and make it depart widely from a more uniform envelope as formed, for example, by successive 180° phase shifts such as those shown by signals 325 and 326 in FIG. 3. Envelope 315 in FIG. 2 represents a signal condition such that no phase shifts at all occur. This continuous envelope 315 is essentially free of all ripple. For data patterns having small angle phase shifts, the envelope does contain some ripple even though it does not drop completely toward zero as is the case for signals 325 and 326 in FIG. 3.

Figure 3:
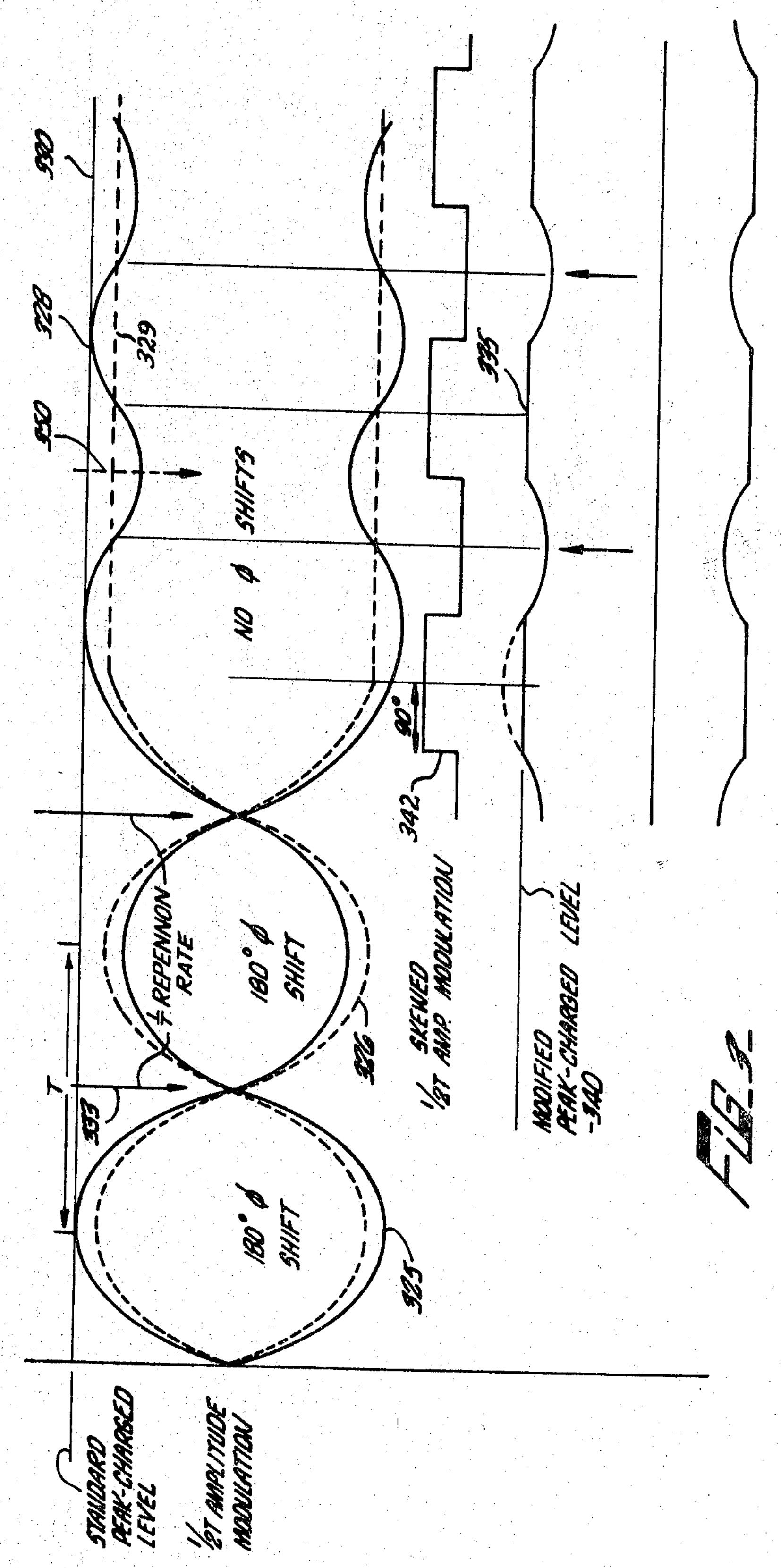
FIG. 3 depicts certain wave-forms at the transmitter and receiver locations of FIG. 1.

A derived clock recovery system of this invention may now be described in light of the vast divergencies in the envelope shapes that are encountered at the receiver. In FIG. 3, signals, due to band-limiting, drop toward zero with well-defined valleys referenced to a standard peak charged level 330. These valleys are located at $1/T$ intervals i.e. at a $1/T$ repetition rate. It is clear from the valley locations that the 180° phase-shift signals 325 and 326 have strong components of $1/T$ frequency. Phase shifts of lesser amounts also have valleys which drop toward zero in the predicted positions, except that the valleys are not as deep, referenced to a peak charged level 330. In any event, however, it follows that a Fourier analysis of the envelope produced by 180° phase shifts (and lesser value phase shifts, as well) include enough $1/T$ components to provide a readily available reference for slaving a local self-oscillating clock generator running at a $1/T$ frequency or repetition rate.

With only small angle or no phase shifts present, however, there is, in the absence of amplitude modulation, no $1/T$ components available to slave the local clock. With amplitude modulation at the transmitter at $1/2T$ rate, the received signals 325, 326 and 328 contain the ripple shown is solid lines. The envelope portion 329 shown in dashed lines represents an envelope which does not contain ripple due to an assumed absence of both amplitude modulation and lack of phase shifts. Comparison of the solid lines with the dashed portions of the abovementioned signals depicts small changes in amplitude due to the amplitude modulation, which small changes are not at all detrimental to signal integrity.

Arrows 333 of FIG. 3 depicts derived clock intervals which will be described in more detail hereinafter. Each arrow 333, up to arrow 350, shown in dashed lines, is in the middle of a modulation period and is thus properly synchronized for data recovery. Dashed arrow 350 on the other hand, is at the indicated valley position as referenced to a standard peak charge level 330. This valley position is not properly synchronized and, thus, if signal 328 were applied to slave a local oscillator it would not be correctly synchronized with the incoming data. By "skewing" or angle offsetting the amplitude modulation signal relative to the modulation periods the valleys introduced by amplitude modulation are properly synchronized with the data. Such an angle offset, in accordance with the principles of this invention, requires an angle shift of 90° for the $1/2T$ signal at the transmitter. A properly skewed amplitude modulation signal 335 is shown in FIG. 3. Signal 342, at the modulator, is thus shifted minus 90° with respect to the beginning of each T interval.

In accordance with the foregoing description it should be understood with reference to FIG. 1, that the A.G.C. amplifier 212 establishes a predetermined reference level for the received envelope. The translated envelope is rectified by a rectifier 230 for application to a $1/T$ clock extractor circuit 235. A $1/T$ pass filter 240 is connected to receive the output of the clock extractor circuit 235 and apply it to a hard limiter 245. The hard-limited output from limiter 245 slaves a self-oscillating local clock 260 running at the $1/T$ rate.

It has been shown earlier that the valleys for 180° and lesser angle phase shifts, and the valleys present because of the skewed $1/2T$ amplitude modulation signal, are properly located at the middle of given modulation periods. Envelope 310 in FIG. 2 exhibits random peaks in a frequency smeared envelope, which experience has shown are highly erratic and thus cannot serve as a proper timing reference for slaving a local oscillator. As discussed hereinbefore however, the valleys although they do not always occur with regularity due to random data patterns, are always properly synchronized with the data when such valleys do occur. Accordingly, a peaked charged reference and a valley detector serve, in accordance with this invention as the primary element for the $1/T$ clock extractor circuit 235, which is shown in schematic form in FIG. 4.

Figure 4:
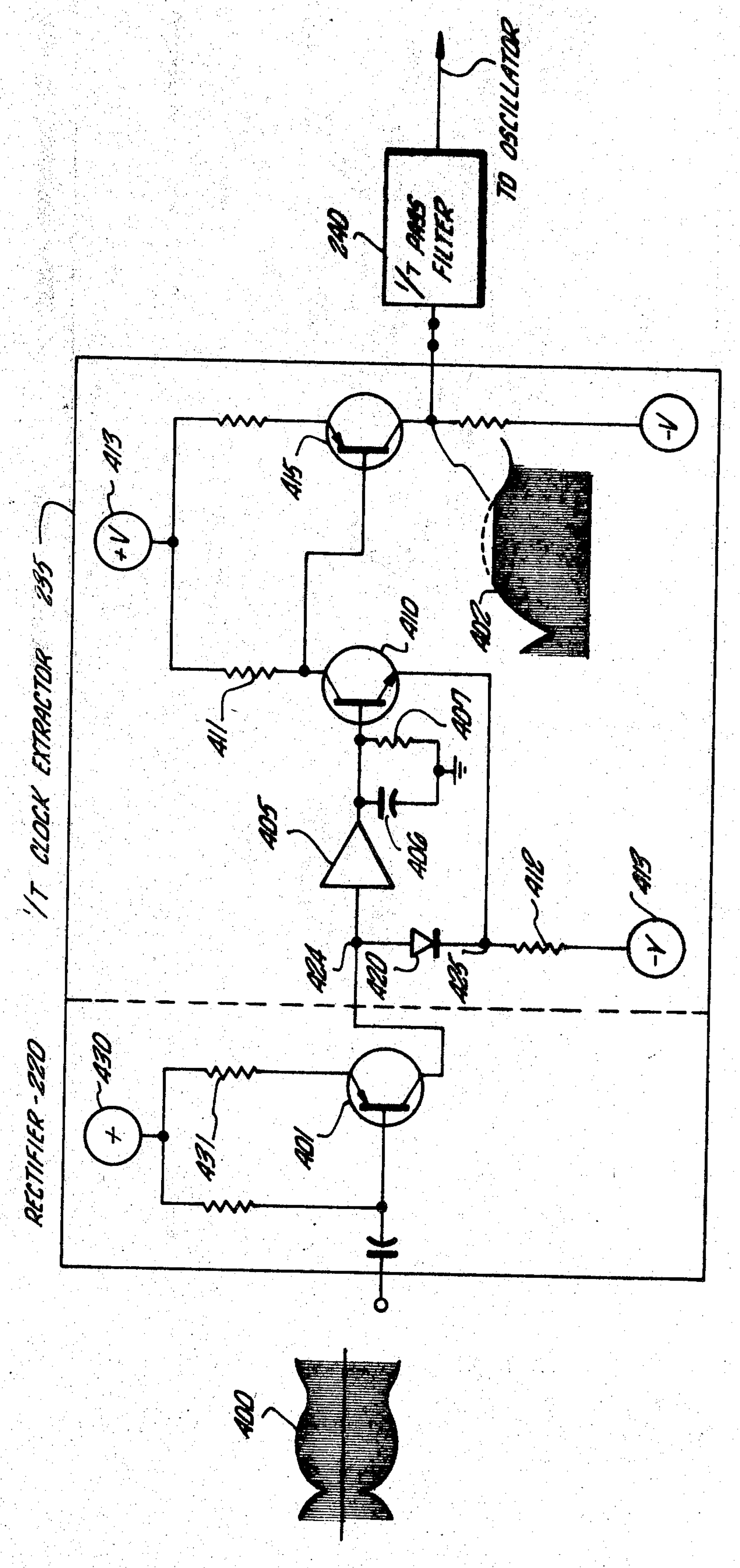
FIG. 4 is a more detailed circuit schematic of circuit components of FIG. 1.

Prior to discussing circuit details of FIG. 4, it should be noted that filter 240 is set to pass only $1/T$ components which are synchronized with the data positions as discussed above. In order to employ the same $1/T$ filter in instances when valleys are established only due to the $1/2T$ amplitude modulation, it is necessary to modify the peak charged level and half-wave rectify the $1/2T$ signal in wave-form 328. Thus, wave-form 335, of FIG. 3, shows a modified peak charged level 340 which serves to purposely distort the amplitude modulated signal by removing the peaks and preserving the valleys. This purposely distorted signal thus contains $1/T$ components which can be passed through the $1/T$ pass filter 240 and hard limited for application as a clock slaving signal to local oscillator 260. This feature our invention thus provides a $1/T$ reference signal which is readily available in accurate synchronism with the incoming data, and which requires, for its operation, a minimum amount of circuit components operating with efficient techniques.

Reference to FIG. 4 depicts a known rectifier 220 which is shown receiving an envelope 400. Rectifier 220 serves as a half-wave rectifier responding to negative half-cycle signals in envelope 400 to supply current from source 430 through resistor 431 and the emitter-collector path of transistor 401 to the junction of 425 of diode 420 and amplifier 405. The $1/T$ clock extractor circuit 235 includes at the output of amplifier 405, a peak charging capacitor 406 in parallel with a large resistance 407. Resistor 407 and capacitor 406 are chosen to exhibit a sufficiently long time-constant so that the base of transistor 410 is referenced to a peak charged level that is essentially constant with the exception of slow variations in response to variations of envelope 401. With the base of transistor 410 held at essentially a constant potential the emitter is likewise held at essentially a constant potential, and thus part of the current through resistor 412 is controlled by transistor 410. As the negative cycle peaks in envelope 400 increase in magnitude, the amount of current supplied to resistor 412 by transistor 401 through diode 420 increases, and thus the voltage at junction 425 similarly increases. Reference to envelope 402 shows that at a given peak input value, the voltage at junction 425 is greater than the base voltage for transistor 410 and transistor becomes back-biased. This circuit operation thus removes the dashed peak of envelope 402

(shown after its inversion by transistor 415). This clipped level is referred to as a modified peak charged level (see level 340, FIG 3). As the input envelope 400 drops below the modified peak charged level the output envelope 402 again follows the input envelope 400.

Circuit parameters for the circuit of FIG. 4 are so adjusted that the modified peak level of envelope 402 is at the proper value to half-wave rectify the $1/2T$ modulation signal. A half-wave rectified $1/2T$ signal has a strong second harmonic at $1/T$ which can readily pass through the $1/T$ pass filter 240 connected to the collector output of transistor 415.

A numerical example will better explain the operation of filter 240 and the band-limited communication link of this invention. For example, at a data rate of 2400 bits per second, three bits of serial data are decoded at a data modulation rate of 800 Hz. Band limiting provides a passband of $1/T$ Hz., with a center frequency at the carrier frequency, $f_0$, of 1700 Hz. The sideband components of an 800 Hz. amplitude modulation signal at the transmitter lie at 900 Hz. and 2500 Hz. and are thus excluded from reaching the receiver. Accordingly, such a signal cannot be employed at the transmitter as a clock signal. An amplitude modulation signal of 400 Hz., or $1/2T$, on the other hand, has sidebands at 1300 Hz. and at 2100 Hz., both of which pass through the band-limited communication link to the receiver 200.

At filter 240 the purposely distorted (half-wave rectified signal 335, FIG. 3) yields components at 800 Hz. which are passed by filter 240, and after hard-limiting by circuit 245, are applied to local oscillator 260. Local oscillator 260 may be any well-known type which is substantially self-oscillating at a $1/T$ or 800 Hz. rate. If an occasional $1/T$ component is obtained from the frequency-smeared envelope 310, then such an occasional and spurious signal will not adversely affect the data-synchronized output from oscillator 260 since its response, as is well known, is limited. Accordingly, any spurious non-synchronized signals will not adversely affect the derived clock system of this invention.

Another possible problem area overcome by the principles and features of this invention is the problem area caused by a shifting of the center frequency, $f_0$, due to certain data patterns. A data pattern which continually requires a 45° phase shift, experience has shown, results in a shift of 100 Hz. This shift means that the center frequency, $f_0$ now appears at either 1600 Hz. or 1800 Hz. rather than its intended 1700 Hz. By reference to the foregoing numerical example it is clear, however, that even if one sideband from the $1/2T$ amplitude modulation signal is blocked by the center frequency shift, the other sideband is passed and thus enough energy is passed to continually update the local oscillator 260.

It was mentioned in the summary of this invention that additional features and enhanced operation of the derived clock system of this invention results from reversing the phase of the modulation signal either at random or at a fixed predetermined amplitude rate by counter 85 at the transmitter 100. This feature together with the unique solution to this potential problem, is discussed in full hereinafter.

The envelope of certain data patterns such as repetitive combinations 0° and 45° phase shifts has an envelope which look very similar to a 400 Hz. amplitude modulated envelope. In some instances, this data pattern could cancel out the 400 Hz. amplitude modulation and, thus, it would be possible that the derived clock would be lost at the receiver 200. By reversing the phase of the 400 Hz. amplitude signal, the possibility of cancellation by the aforementioned data pattern is precluded. Experience throughout all data patterns generally in use today has confirmed that no data pattern exists which can cancel out the 180° phase reversed 400 Hz. amplitude modulated signal. Even highly unusual patterns which may come in use can be compensated for as described hereinafter.

A phase reversal of the $1/2T$ signal at transmitter 100, FIG. 1, is readily accomplished by counter 85, inverter 86, and the associated logic gates 87 and 88. Counter 85 counts each output from divider circuit 55 and is so arranged that its output inhibits gate 88 for a predetermined count such as three or any other suitable number of pulses from divider 55. With gate 88 inhibited, gate 87 is satisfied to allow an inverted output from divider 75 to pass to the angle offset circuit 80. For a subsequent predetermined count by counter 85, the inhibit signal for gate 88 is removed and the non-inverted output signal from divider 75 is applied through gate 88 to the angle offset-circuit 80. It was mentioned hereinbefore that experience with all known data patterns has confirmed that no data pattern exists which can, by chance, cancel out the 180° phase reversed 400 Hz. amplitude modulated signal. If, however, difficulty should rise with a unique group of data patterns, it is a simple matter to randomly vary the count of counter 85 so as to reverse the phase of the $1/2T$ signal from divider circuit 75 on a random basis rather than on a predetermined count basis. Such random modification of counter 85 is within the skill of those familiar with this art and need not be discussed in detail.

The subject invention has been described with reference to certain preferred embodiments; it will be understood by those skilled in the art to which this invention pertains that the scope and spirit of the appended claims should not necessarily be limited to the illustrative embodiments described in detail herein.

What is claimed is:

1. A derived clock circuit in a system including a transmitter for transmitting data during a repetitive sequence of modulation periods T in which a carrier frequency $f_0$ is phase shifted to contain data representing phase shifts at substantially the center of certain modulation periods and is maintained free of phase shifts during other modulation periods, said carrier frequency forming an envelope, when transmitted to a receiver over a band-limited communication link having a passband width of $1/T$ Hz. and a center frequenchy of $f_0$, which is characterized in that the presence of said data containing phase shifts introduces ripple into said carrier envelope having a $1/T$ signal component synchronized in time relative to the center of said modulation periods, and the absence of such data containing phase shifts yields an envelope that is free from ripple, said system comprising means at said transmitter for further modulating said carrier at least during said non data-containing portions to introduce into said envelope a further ripple having at least a portion of said further ripple synchronized with the center of said modulation periods, means at said receiver for recovering said carrier envelope, envelope distorting means connected to said envelope receiving means for removing the portion of said further ripple which is not synchronized in time relative to the center of said modulation periods;

means connected to said distorting means for deriving from said envelope a $1/T$ output signal synchronized in time with the center of said modulation periods; and a self-oscillating clock slaved to the output signal emitted from said signal deriving means.

2. A derived clock circuit in accordance with claim 1 and further comprising:

an angle modulator at said transmitter, said angle modulator emitting a data modulated carrier in which assigned data combinations are represented as phase differences in successive modulation periods T at a first $1/T$ phase modulation frequency; and said further modulating means comprises an amplitude modulator at said transmitter operative during said modulation periods for additionally amplitude modulating said data modulated carrier at a second $1/2T$ frequency.

3. A derived clock circuit in accordance with claim 2 and further comprising:

means associated with said amplitude modulator for shifting said $1/2T$ amplitude modulating signal a predetermined angle amount relative the beginning of each of said modulation periods.

4. A derived clock circuit in accordance with claim 3 wherein:

said predetermined angle amount is plus or minus ninety degrees.

5. A derived clock circuit in accordance with claim 4 and further comprising:

means for reversing the phase of said $1/2T$ amplitude modulating signal once every predetermined number of cycles.

6. A derived clock system in accordance with claim 5 wherein:

said predetermined number of amplitude modulation cycles are three.

7. A derived clock circuit in accordance with claim 4 and further comprising:

means for reversing the phase of said $1/2T$ amplitude modulating signal on a random number of cycles.

8. A derived clock circuit in accordance with claim 2 wherein:

said data transmission system comprises a data transmission link including a bandwidth filter having a passband width of about $1/T$ Hz. and a center frequency of $f_0$ where:

T is the modulation period, $f_0$ is the carrier frequency, and

Hz. is cycles per second;

said filter blocking sideband components of said $1/T$ frequency from reaching said receiver, and passing to said receiver, at least one sideband component of said $1/2T$ frequency.

9. A derived clock circuit in accordance with claim 8 wherein:

said first $1/T$ signal component in said data-containing envelope is provided by said data representing phase shifts of said carrier envelope after it is band limited by said bandwidth filter.

10. A derived circuit in accordance with claim 2 wherein:

said further ripple on said carrier envelope is a sinusoidal signal having said second $1/2T$ frequency with negative half cycles thereof synchronized in time relative to the center of said modulation periods, and wherein said envelope distorting means comprises a half wave rectifier means biased at a level to remove the positive half cycles of said $1/2T$ sinusoidal signal and preserve the negative half cycles thereof.

11. A derived clock circuit in accordance with claim 10 wherein said $1/T$ output signal deriving means comprises a pass filter means for passing $1/T$ signals to said self-oscillating clock circuit, said clock circuit running at substantially said $1/T$ rate and slaved to the output signal passed by said pass filter means.

12. A derived clock system for a data receiver at a signal transmission link, said system comprising:

a transmitter for transmitting data during a repetitive sequence of modulation periods T in which a carrier frequency $f_0$ is phase shifted to contain data during certain modulation periods and is maintained free of phase shifts during other non data-containing modulation periods;

means at said transmitter for amplitude modulating said carrier at a $1/2T$ rate at least during said modulation periods that are free of phase shifts;

filter means connected in the signal transmission link for receiving said modulated carrier signal, said filter means characterized as having a passband width of about $1/T$ Hz. and a center frequency of $f_0$ (where Hz. is cycles per second) and further characterized emitting a carrier envelope having a $1/T$ signal component synchronized relative to the data-containing portions of said band-limited envelope at the output of said filter means, and having a $1/2T$ signal component in the envelope at least during periods when no data-containing portions are present;

means connected to receive the emitted carrier for half-wave rectifying and $1/2T$ signal to derive therefrom an additional $1/T$ signal component also synchronized with the assigned modulation periods;

means connected to said half-wave rectifying means for isolating both said $1/T$ signal component from said carrier and the additional $1/T$ signal derived by said half-wave rectifying means; and a clock generator connected to said isolating means and slaved by the $1/T$ signals from said isolating means.

References Cited

UNITED STATES PATENTS

| | | | |
|---|---|---|---|
| 3,110,862 | 11/1963 | Chasek | 325—30 |
| 3,119,964 | 1/1964 | Crafts | 325—30 |
| 3,157,741 | 11/1964 | Bennett et al. | 178—66 |
| 3,248,664 | 3/1966 | Kransnick et al. | 178—69.5 |
| 3,294,907 | 12/1966 | Heald | 325—30 |
| 3,376,511 | 3/1968 | Brothman et al. | 178—67 |

RICHARD MURRAY, Primary Examiner

J. A. BRODSKY, Assistant Examiner

U.S. Cl. X.R.

178—67, 69.5; 325—161, 320